United States Patent
Lee

(10) Patent No.: US 6,579,631 B2
(45) Date of Patent: Jun. 17, 2003

(54) ELECTROLUMINESCENCE DEVICE AND METHOD FOR MANUFACTURING THE SAME

(75) Inventor: Jong Won Lee, Daejon-Kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 35 days.

(21) Appl. No.: 09/893,561

(22) Filed: Jun. 29, 2001

(65) Prior Publication Data

US 2002/0081455 A1 Jun. 27, 2002

(30) Foreign Application Priority Data

Dec. 27, 2000 (KR) ........................ 2000-83099

(51) Int. Cl.[7] .................... H05B 33/12; H05B 33/10
(52) U.S. Cl. ............... 428/690; 428/403; 428/917; 313/502; 313/505; 313/509; 427/66; 427/212
(58) Field of Search ................ 428/690, 917, 428/403; 313/502, 505, 509; 427/66, 212

(56) References Cited

U.S. PATENT DOCUMENTS

| | | | | |
|---|---|---|---|---|
| 5,123,847 A | * | 6/1992 | Holmberg et al. | ............ 437/48 |
| 5,757,026 A | * | 5/1998 | Forrest et al. | ................ 257/40 |
| 5,912,533 A | * | 6/1999 | Lee et al. | .................... 313/503 |
| 6,180,029 B1 | * | 1/2001 | Hampden-Smith et al. | ........ 252/301.4 R |
| 6,254,805 B1 | * | 7/2001 | Potter | ................ 252/301.4 R |
| 6,411,726 B1 | * | 6/2002 | Pires | ........................ 382/124 |
| 2002/0079835 A1 | * | 6/2002 | Lee | ............................ 313/506 |

* cited by examiner

Primary Examiner—Cynthia H. Kelly
Assistant Examiner—Dawn Garrett
(74) Attorney, Agent, or Firm—Morgan, Lewis & Bockius LLP

(57) ABSTRACT

An electroluminescence device and a method for manufacturing the same minimize the process steps and the manufacturing cost, and allow a sufficiently high light-emitting effect under a low driving voltage. The electroluminescence device includes a substrate, a lower electrode layer formed on the substrate, a light-emitting layer formed on the lower electrode layer, an upper electrode layer formed on the light-emitting layer, and a passivation layer formed on the upper electrode layer. The method for manufacturing an electroluminescence device includes the steps of forming a lower electrode layer on a substrate, forming a light-emitting layer on the lower electrode layer, forming an upper electrode layer on the light-emitting layer, and forming a passivation layer on the upper electrode.

20 Claims, 4 Drawing Sheets

ELECTROLUMINESCENCE DEVICE AND METHOD FOR MANUFACTURING THE SAME

The present invention claims the benefit of Korean Patent Application No. P2000-83099 filed in Korea on Dec. 27, 2000, which is hereby incorporated by reference.

BACKGROUND OF THE INVENTION

1. Field of the Invention

The present invention relates to a display device, and more particularly, to an electroluminescence device and a method for manufacturing the same.

2. Discussion of the Related Art

Ultra thin flat panel display devices, especially liquid crystal display (LCD) devices, are widely used in monitors for notebook computers, spacecrafts, and aircrafts.

Of such LCDs, a passive luminescence LCD device includes a back light provided at the rear of a liquid crystal panel and used as a light source. The back light adds additional weight, power consumption, and thickness to the LCD device. In this respect, it is expected that the back light will eventually be replaced by an advanced high efficiency self-luminescence display device. Currently, a thin and light electroluminescence device is being researched and developed.

Electroluminescence devices can be divided into light-emitting diodes (LEDs) and electroluminescence diodes (ELDs) depending on the application principles. A LED is based on radiant transition course of electron-hole recombinations near a P-N junction. Recently, rapid development of LEDs using an organic material is in progress.

An ELD is based on luminescence generated when high energy electrons generated within a light-emitting layer excite a phosphor layer by impact. Basically, the electrons within the light-emitting layer obtain energy under a high electric field, thereby generating hot electrons. The hot electrons then excite and release an activator, thereby generating light.

ELDs are generally manufactured by a thick film printing process by using a mixture of resin and light-emitting powder. Alternatively, a thin film printing process may be used. Also, ELDs are divided into an AC type and a DC type depending on different driving modes.

A related art electroluminescence device will now be described with reference to the accompanying drawings.

FIG. 1 is a schematic view of a related art electroluminescence device. As shown in FIG. 1, the related art electroluminescence device includes a substrate 11, a transparent electrode layer 13 formed on the substrate 11 in a predetermined pattern such as a stripe pattern, a lower insulating layer 15 of $SiO_x$, $SiN_x$, or $BaTiO_3$ formed on the transparent electrode layer 13, a light-emitting layer 17 of ZnS based light-emitting material formed on the lower insulating layer 15, and an upper insulating layer 19 of $SiO_x$, $SiN_x$, or $Al_2O_3$ formed on the light-emitting layer 17. It further includes a metal electrode layer 21 of a metal, such as Al, formed on the upper insulating layer 19, and a surface passivation layer 23 formed on the metal electrode layer 21.

In the aforementioned related art electroluminescence device, when an AC voltage is applied to the transparent electrode layer 13 and the metal electrode layer 21, a high electric field of $\sim 10^6$ V/cm is formed within the light-emitting layer 17. Electrons generated in the interface between the upper insulating layer 19 and the light-emitting layer 17 are tunneled into the light-emitting layer 17.

The tunneled electrons are accelerated by the high electric field within the light-emitting layer 17. The accelerated electrons come into collision, with an activator (Cu or Mn) within the light-emitting layer 17 so that electrons are excited from the ground state. When the excited electrons are again transited to the ground state, a unique light equivalent to the energy difference is emitted. At this time, the color of the emitted light depends on the energy difference.

A method for manufacturing the aforementioned related art electroluminescence device will now be described. As shown in FIG. 1, the transparent electrode layer 13 is formed on the glass substrate 11. In more detail, an indium tin oxide (ITO) thin film having a high conductivity and transparent physical characteristic is deposited on the substrate 11. The ITO thin film is then patterned by a photolithography process to form a stripe shape, thereby forming transparent electrodes.

Afterwards, the $BaTiO_3$ based lower insulating layer 15 is formed on the transparent electrode layer 13 by a RF reactive sputtering process. The light-emitting layer 17 is then formed on the lower insulating layer 15.

The light-emitting layer 17 may be formed by an electron-beam deposition, e.g., by cold pressing a powder in which Cu or Mn is doped on ZnS and generating small grains. Alternatively, the light-emitting layer 17 may be formed by a sputtering method using a target.

The upper insulating layer 19 of $SiO_x$, $SiN_x$, or $Al_2O_3$ is formed on the light-emitting layer 17 by a sputtering process or chemical vapor deposition (CVD) process.

The metal electrode layer 21 is formed on the upper insulating layer 19. An Al or Ag thin film is formed on the upper insulating layer 19 by a thermal deposition method and then stripe shaped metal electrodes are formed to cross the transparent electrodes of the transparent electrode layer 13. The surface passivation layer 23 is finally formed on the metal electrode layer 21. Thus, the related art process for manufacturing an electroluminescence device is completed.

However, the related art electroluminescence device and the method for manufacturing the same have several problems. Since the electroluminescence device requires a high electric field, an insulating layer is required both above and below the light-emitting layer to prevent a short circuit resulting from any defect. The insulating layer limits the maximum current flowing to the device to a range corresponding to the discharge and charge displacement of the insulating layer.

In case where the light-emitting layer is formed by either a vacuum deposition method according to the sputtering method or a thick film printing method using a powder, the insulating layer is normally formed by screen printing using an organic binder. This increases the required process steps and the manufacturing cost.

Furthermore, since the insulating layer is respectively formed above and below the light-emitting layer, a voltage drop occurs as a result. For this reason, a threshold voltage required to drive the device becomes higher. In other words, an undesirably high driving voltage is required.

SUMMARY OF THE INVENTION

Accordingly, the present invention is directed to an electroluminescence device and a method for manufacturing the same that substantially obviate one or more of the problems due to limitations and disadvantages of the related art.

An object of the present invention is to provide an electroluminescence device and a method for manufacturing the same that minimize the process steps and the manufacturing cost.

Another object of the present invention is to provide an electroluminescence device and a method for fabricating the same that can obtain a sufficiently high light-emitting effect under a low driving voltage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an electroluminescence device according to the present invention includes a substrate, a lower electrode layer formed on the substrate, a light-emitting layer formed directly on the lower electrode layer, an upper electrode layer formed on the light-emitting layer, and a passivation layer formed on the upper electrode layer.

In another aspect of the present invention, an electroluminescence device including a substrate; a transparent electrode layer on the substrate; a light-emitting layer including a light-emitting powder formed on the transparent electrode layer, the light-emitting powder being coated with an insulating material on a surface; a metal electrode layer formed on the light-emitting layer; and a passivation layer formed on the metal electrode layer.

To further achieve these and other advantages and in accordance with the purpose of the present invention, a method for manufacturing an electroluminescence device according to the present invention includes the steps of forming a lower electrode layer on a substrate, forming a light-emitting layer directly on the lower electrode layer, forming an upper electrode layer on the light-emitting layer, and forming a passivation layer on the upper electrode layer.

In another aspect of the present invention, a method for manufacturing an electroluminescence device including the steps of forming a transparent electrode layer on a substrate; forming a light-emitting layer including a light-emitting powder on the transparent electrode layer, the light-emitting powder being coated with an insulating material with a high dielectric constant on a surface; forming a metal electrode layer on the light-emitting layer; and forming a passivation layer on the metal electrode layer.

In an exemplary embodiment of the present invention, an insulating material having a high dielectric constant is coated on a surface of a light-emitting powder without forming a separate insulating layer on and below the light-emitting layer, so that the process steps and the manufacturing cost can be minimized. Since a separate insulating layer is not formed on and below the light-emitting layer, a threshold voltage required to drive the device is not unnecessarily increased, thereby reducing the driving voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
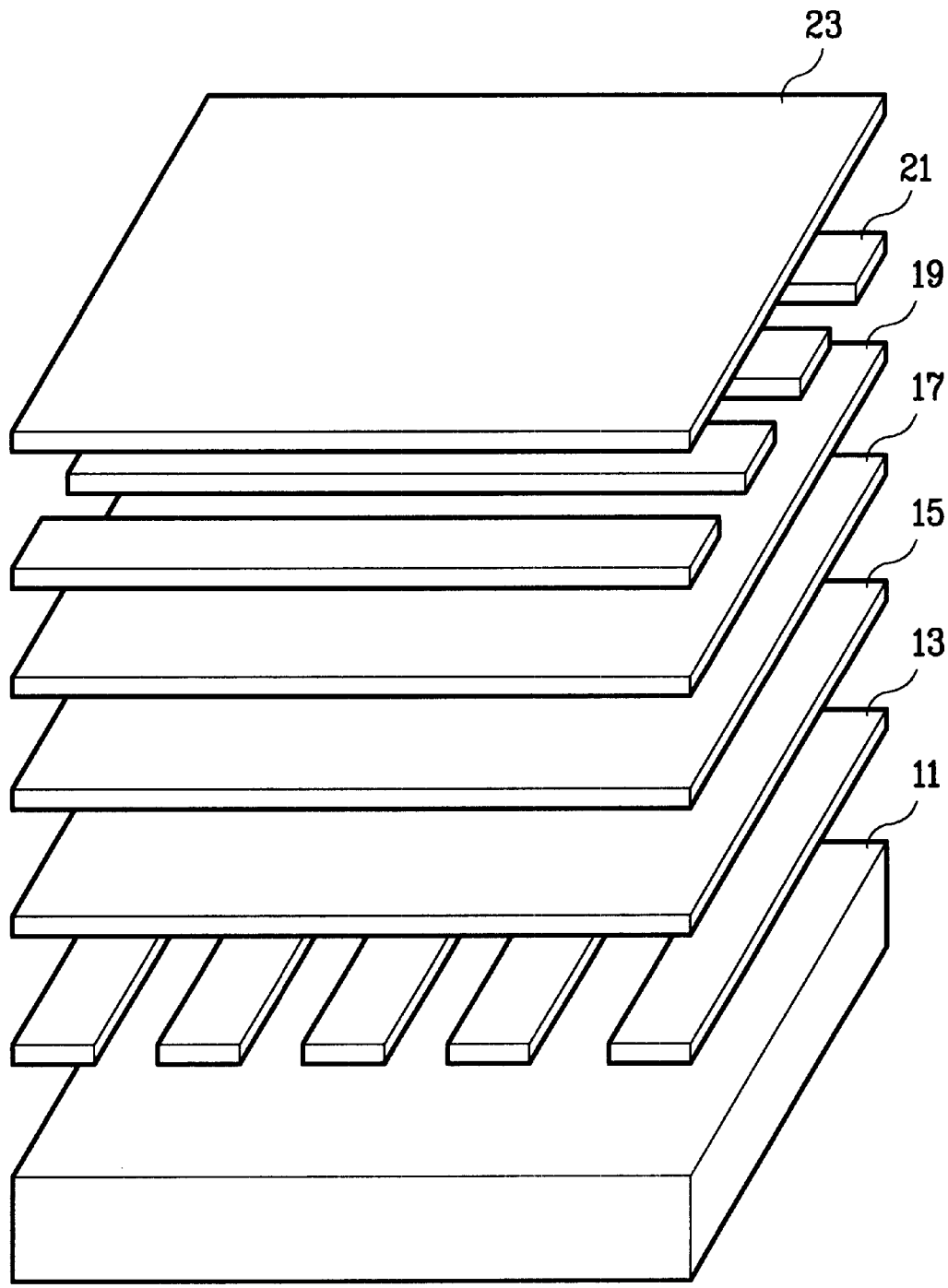
FIG. 1 is a schematic view of a related art electroluminescence device.
Figure 2:
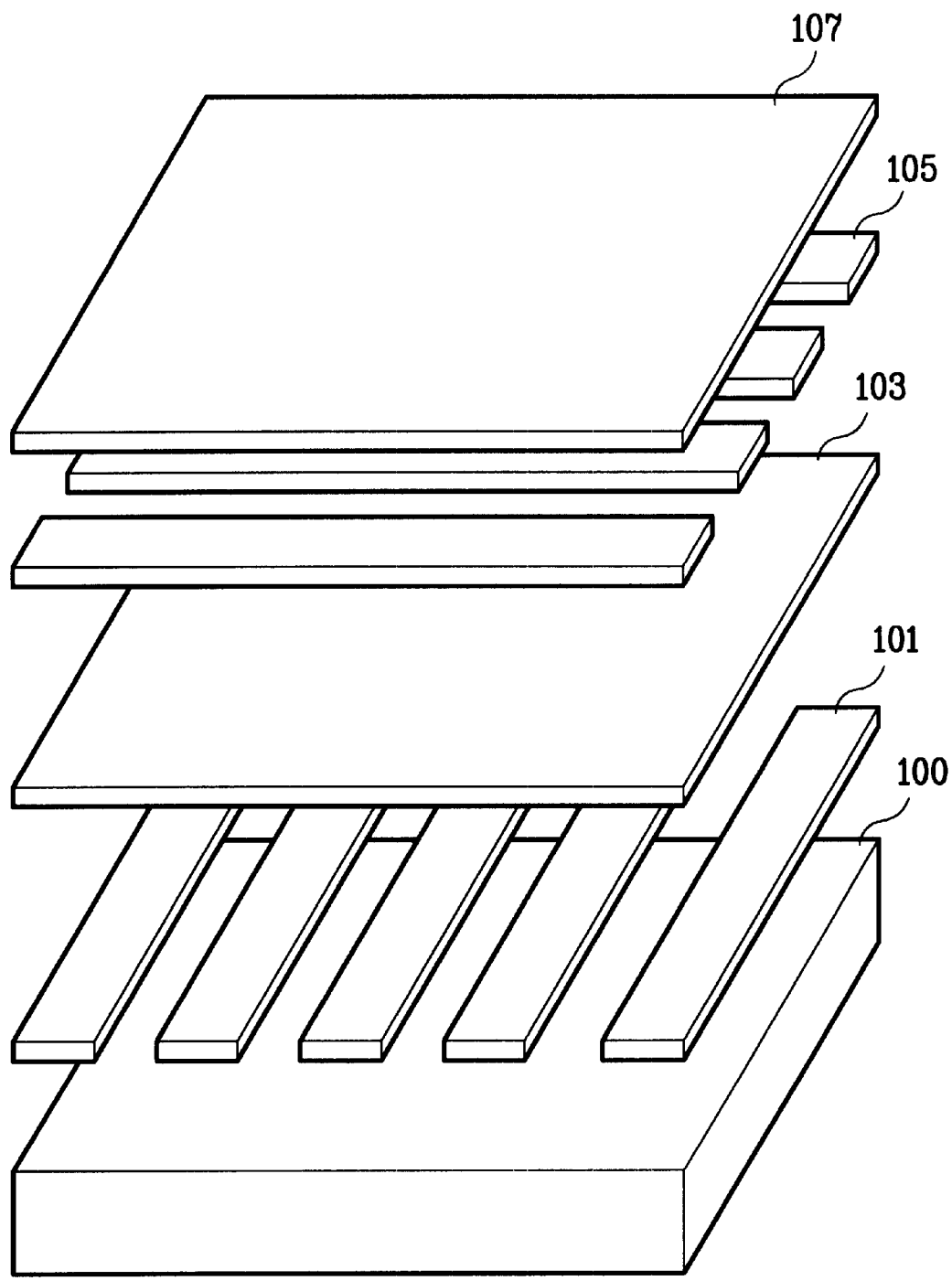
FIG. 2 is a schematic view of an electroluminescence device according to the present invention.
Figure 3:
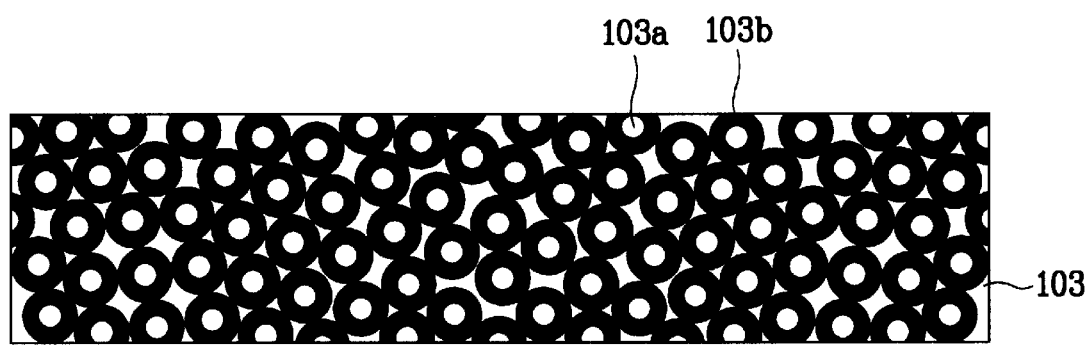
FIG. 3 is an enlarged sectional view of a light-emitting layer 103 shown in FIG. 2.

FIG. 2 is a schematic view of an electroluminescence device according to the present invention, and FIG. 3 is an enlarged sectional view of a light-emitting layer shown in FIG. 2.

As shown in FIG. 2, an electroluminescence device according to the present invention includes a substrate 100, a lower electrode layer 101 formed on the substrate 100, a light-emitting layer 103 formed on the lower electrode layer 101, an upper electrode layer 105 formed on the light-emitting layer 103, and a passivation layer 107 turned on the upper electrode layer 105.

In the present invention, it is noted that a separate insulating layer is not formed above and below the light-emitting layer 103, unlike the related art electroluminescence device. Instead, the light-emitting layer 103 includes a mixture of light-emitting powder 103a coated with an insulating material 103b having a high dielectric constant, as shown in FIG. 3.

An example of the insulating material 103b coated on the light-emitting powder 103a is a $BaTiO_3$ based material. The thickness of the insulating material 103b is determined depending on the percentage by weight of $BaTiO_3$ in a mixture of a tetra alkyl titanate based material, a tetra alkyl barium oxide based material, and alcohol. Preferably, the percentage by weight of $BaTiO_3$ is controlled within a range of approximately 4~6%.

The lower transparent electrode layer 101 is formed by patterning a transparent conductive material such as ITO in a stripe shape. The upper metal electrode layer 105 is formed by patterning an Al based material or a metal such as Ag in a direction substantially perpendicular to the lower electrode layer 101. The lower electrode layer 101 is formed in such a manner that a transparent ITO thin film is formed by a sputtering process and then patterned in a stripe shape by a photolithography process.

A method for manufacturing the aforementioned electroluminescence device according to the present invention will now be described with reference to FIGS. 4A to 4D.

Figure 4A:
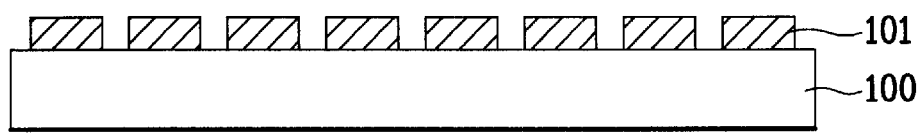
FIGS. 4A to 4D are sectional views illustrating a method for manufacturing an electroluminescence device according to the present invention.

As shown in FIG. 4A, the lower electrode layer is formed on the substrate (e.g., glass substrate) 100. The transparent conductive material such as ITO is deposited on the substrate 100 and then patterned by photolithography processes to form a plurality of stripe shaped transparent electrodes 101 in one direction.

Figure 4B:

Subsequently, as shown in FIG. 4B, the light-emitting layer 103 is formed on the transparent electrodes 101. The light-emitting layer 103 is formed in such a manner that a tetra alkyl titanate based material is mixed with a tetra alkyl barium oxide based material to form a $BaTiO_3$ solution and the $BaTiO_3$ solution is mixed with alcohol to allow the percentage by weight of $BaTiO_3$ to reach a predetermined range. At this time, $Ti(OCH_3)_4$, $Ti(OC_2H_5)_4$, $Ti(OC_3H_7)_4$, $Ti(OC_4H_9)_4$, or $Ti(OC_4H_9)_4$ may be used as the tetra alkyl titanate based material, and $Ba(OCH_3)_4$, $Ba(OC_2H_5)_4$, $Ba(OC_3H_7)_4$, or $Ba(OC_4H_9)_4$ is used as the tetra alkyl barium oxide based material.

Meanwhile, the percentage by weight of $Ba(TiO_3)_4$ corresponding to the preferred coating thickness of the $Ba(TiO_3)_4$ is 4~6%, approximately. The coating thickness is determined by controlling the percentage by weight of $Ba(TiO_3)_4$.

The mixture of light-emitting powder (e.g., ZnS particles) 103a on which an activator is doped is appropriately added to a resultant product claimed by controlling the percentage by weight of $Ba(TiO_3)_4$. Then, an ultrasonic dispersion is carried out in the resultant product to which the light-emitting powder is added, for approximately one hour. The ultrasonic dispersion is to enhance the isolation effect between the ZnS particles by uniformly dispersing the ZnS particles 103a, so that the ZnS particles are effectively coated with $BaTiO_3$.

Afterwards, the light-emitting powder coated with $BaTiO_3$ is filtered and annealed in a vacuum furnace at a crystallization temperature of $BaTiO_3$. At this time, the crystallization temperature is approximately 500~600° C.

The light-emitting powder 103a coated with $BaTiO_3$ on a surface at an appropriate thickness is mixed with a binder and then coated on the transparent electrode layer 101 by a spin coating method. Drying and annealing processes are finally performed. As a result, the light-emitting layer 103 is formed.

Figure 4C:
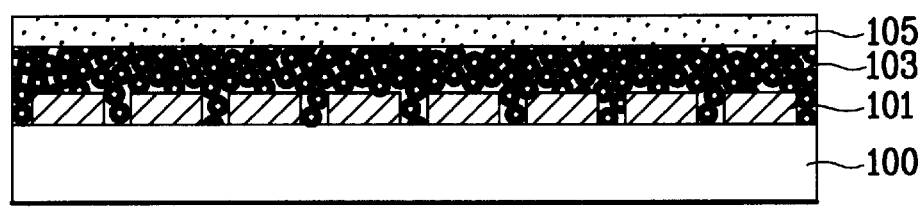

As shown in FIG. 4C, the upper electrode layer 105 is formed on the light-emitting layer 103. A metal layer such as Al and Ag is formed and then the metal electrodes 105 are formed in stripe shapes to cross the transparent electrodes 101. Various methods, such as the thermal deposition method, the sputtering method, and the CVD method, can be used to form the metal layer.

Figure 4D:
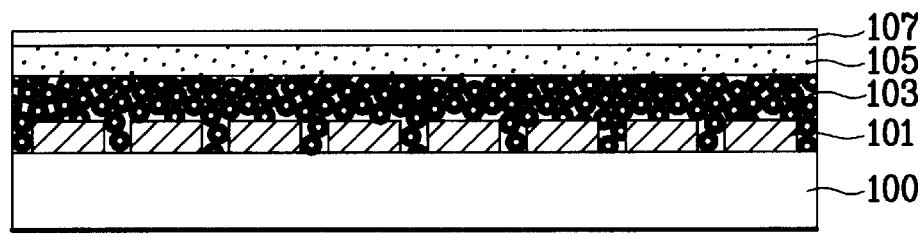

Finally, as shown in FIG. 4D, the passivation layer 107 is formed on the upper electrode layer 105, so that the process for manufacturing the electroluminescence device according to the present invention is completed.

The electroluminescence device and the method for manufacturing the same according to the present invention have the following advantages. First, since no insulating layer is formed on and below the light-emitting layer, the process steps can be minimized, and thus the manufacturing cost can be reduced. In addition, since the light-emitting layer is formed of the light-emitting powder coated with an insulating material having a high dielectric constant, a threshold voltage required to drive the device can be reduced. Thus, the device can be driven with a low voltage. Furthermore, in cases where the electroluminescence device is used as a back light for notebook computers or various monitors, the thickness of the entire device can be reduced. This enables thinner sized notebook computers and monitors to be manufactured.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An electroluminescence device comprising:
   a substrate;
   a lower electrode layer formed on the substrate;
   a light-emitting layer formed directly on the lower electrode layer;
   an upper electrode layer formed on the light-emitting layer; and
   a passivation layer formed on the upper electrode layer.

2. The electroluminescence device of claim 1, wherein the light-emitting layer includes a light-emitting powder coated with an insulating material.

3. The electroluminescence device of claim 2, wherein the insulating material includes $BaTiO_3$.

4. An electroluminescence device comprising:
   a substrate;
   a transparent electrode layer on the substrate;
   a light-emitting layer including a light-emitting powder formed on the transparent electrode layer, the light-emitting powder being coated with an insulating material;
   a metal electrode layer formed on the light-emitting layer; and
   a passivation layer formed on the metal electrode layer.

5. The electroluminescence device of claim 4, wherein the insulating material includes $BaTiO_3$.

6. The electroluminescence device of claim 5, wherein a coating thickness of the insulating material is based on a percentage by weight of $BaTiO_3$ contained in a mixture of alcohol, a tetra alkyl titanate based material and a tetra alkyl barium oxide based material.

7. The electroluminescence device of claim 6, wherein the percentage by weight of $BaTiO_3$ is within a range of approximately 4~6%.

8. A method for manufacturing an electroluminescence device comprising the steps of:
   forming a lower electrode layer on a substrate;
   forming a light-emitting layer directly on the lower electrode layer;
   forming an upper electrode layer on the light-emitting layer; and
   forming a passivation layer on the upper electrode layer.

9. The method of claim 8, wherein the step of forming the lower electrode layer includes the steps of:
   forming a transparent conductive material on the substrate; and
   pattering the transparent conductive material to form a plurality of transparent electrodes.

10. The method of claim 8, wherein the step of forming the light-emitting layer includes the steps of:
    coating an insulating material having a high dielectric constant on a light-emitting powder;
    annealing the light-emitting powder coated with the insulating material; and
    mixing the annealed light-emitting powder with a binder to form a mixture and coating the mixture on the lower electrode layer.

11. The method of claim 10, wherein the step of coating the insulating material includes the steps of:
    mixing a tetra alkyl titanate based material with a tetra alkyl barium oxide based material to form a first product;
    mixing the first product with alcohol to form a second product; and
    adding the light-emitting powder to the second product to coat surfaces of the light-emitting powder with the insulating material.

12. The method of claim 11, wherein the insulating material has a coating thickness determined by a percentage by weight of $BaTiO_3$ contained in the second product.

13. The method of claim 12, wherein the percentage by weight of $BaTiO_3$ is within a range of approximately 4~6%.

14. The method of claim 11, wherein the step of coating the insulating material further includes the steps of:

carrying out an ultrasonic dispersion of a resultant product obtained by coating the surfaces of the light-emitting powders with the insulating material; and filtering the resultant product.

15. The method of claim 10, wherein the annealing temperature is controlled by a crystallization temperature of $BaTiO_3$.

16. The method of claim 15, wherein the annealing temperature is within a range of approximately 500~600° C.

17. The method of claim 10, wherein the step of forming the light-emitting layer further includes the step of performing drying and annealing processes.

18. A method for manufacturing an electroluminescence device comprising the steps of:

forming a transparent electrode layer on a substrate;

forming a light-emitting layer including a light-emitting powder on the transparent electrode layer, the light-emitting powder being coated with an insulating material with a high dielectric constant;

forming a metal electrode layer on the light-emitting layer; and forming a passivation layer on the metal electrode layer.

19. The method of claim 18, wherein the step of forming the light-emitting layer includes the steps of:

mixing a tetra alkyl titanate based material with a tetra alkyl barium oxide based material, to form a first mixture;

mixing the first mixture with alcohol to form a second mixture;

adding the light-emitting powder to the second mixture to coat surfaces of the light-emitting powder with the insulating material;

performing an ultrasonic dispersion of the coated light-emitting powder;

filtering the light-emitting powder;

primarily annealing the light-emitting powder and mixing the light-emitting powder with a binder to form a third mixture, and spin coating the third mixture on the transparent electrode layer; and drying and secondarily annealing the coated light-emitting powder.

20. The method of claim 19, wherein the temperature in the primarily annealing step is controlled by a crystallization temperature of $BaTiO_3$.

* * * * *